June 12, 1956

D. DAY 2,750,010

AUTOMATIC PARKING BRAKE FOR MOTOR VEHICLES

Filed July 29, 1953

INVENTOR.
DOYLE DAY
BY H. M. Kilpatrick
ATTORNEY.

June 12, 1956 D. DAY 2,750,010
AUTOMATIC PARKING BRAKE FOR MOTOR VEHICLES
Filed July 29, 1953 3 Sheets-Sheet 2

INVENTOR.
DOYLE DAY
BY *J. M. Kilpatrick*
ATTORNEY.

June 12, 1956  D. DAY  2,750,010
AUTOMATIC PARKING BRAKE FOR MOTOR VEHICLES
Filed July 29, 1953  3 Sheets-Sheet 3
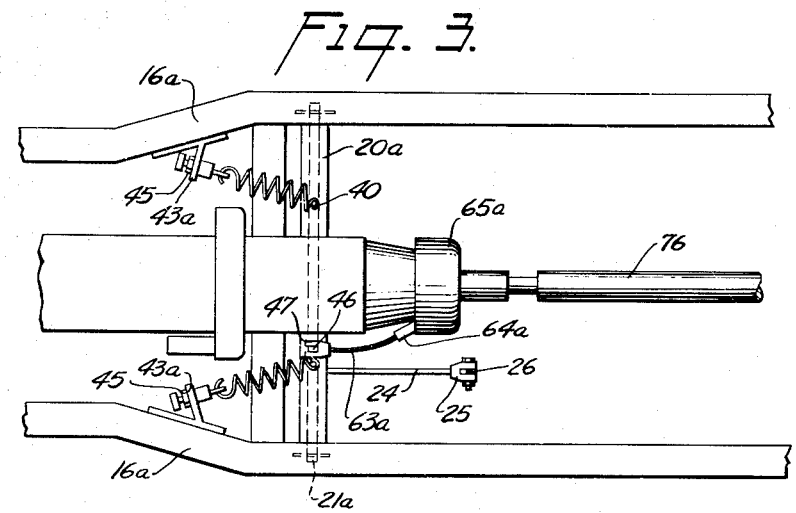
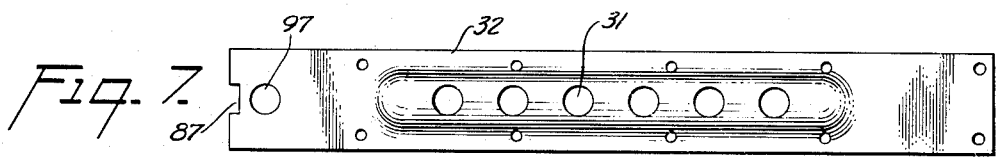
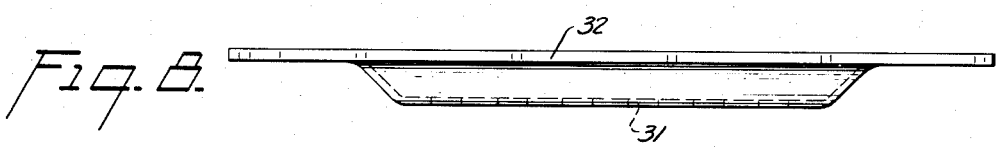
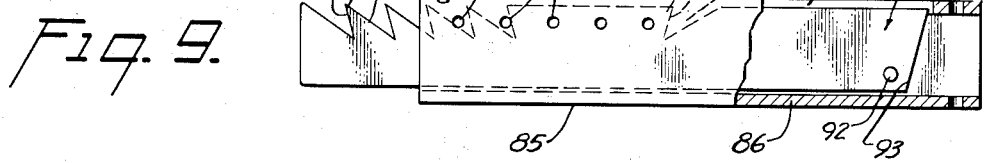
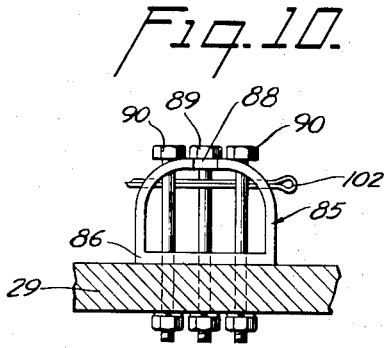
INVENTOR.
DOYLE DAY
BY
ATTORNEY.

United States Patent Office 2,750,010
Patented June 12, 1956

2,750,010
AUTOMATIC PARKING BRAKE FOR MOTOR VEHICLES

Doyle Day, New York, N. Y.

Application July 29, 1953, Serial No. 371,019

11 Claims. (Cl. 188—109)

This invention relates to new and useful improvements in an automatic brake mechanism for a motor vehicle.

More particularly, the present invention proposes the provision of an improved brake applying mechanism applied to a motor vehicle which will automatically operate to apply the brakes the moment the operator of the car leaves his seat in a manner to prevent the car from running away during the operator's absence.

Another object of the present invention proposes providing the car with a pivotally mounted operator's seat cushion which will be depressed as long as the operator is seated thereon in a manner so that the brake applying mechanism will be inoperative with the brakes released so that the vehicle will be free for normal operation.

A still further object of the present invention proposes arranging the operator's seat cushion so that when the operator leaves his seat, the seat will be free to pivot and rise, causing the brake applying mechanism to apply the brakes of the vehicle and retain them applied until the operator again occupies his seat.

Another object is to apply means for positively holding the seat cushion raised or lowered, whereby when the seat cushion is raised and the brakes are applied, the seat cushion may be sat upon without releasing the brakes, and whereby when the seat cushion is lowered it may be positively held lowered and brakes released, so that the operator may rise from his seat without applying the brakes.

The invention further proposes the construction of an automatic brake applying mechanism which may be installed as standard equipment on new vehicles or which may be quickly and easily applied to vehicles now in use.

Still further the present invention proposes the construction of a novel and improved automatic brake applying mechanism which will function to apply the brakes and retain them applied all the time the operator of the vehicle is out of his seat.

Additional objects of the invention are to effect simplicity and efficiency in such mechanisms and to provide an extremely simple mechanism of this kind which is convenient, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a seat supported on a motor vehicle chassis, and a seat cushion hingedly mounted at its rear part on said support for up and down movement at its front part. A recessed member mounted across the front margin of the lower face of the seat is provided with a series of lower recess openings, in one of which an upwardly extended pressure link may be engaged. A spring operated brake operating means connected to said link is adapted to yieldably force the link and seat upwardly to an upper position and to pull upon a brake applying cable when the seat is unoccupied and to be actuated by the link to release the cable when the seat is pressed down by an occupant. A block is secured to the rear end of the cable; and a cable attached to said block has its ends secured to rear brakes of the vehicle for operating the brakes.

A tubular detent rail longitudinal to the vehicle and secured on the floor having an upper longitudinal slot receives a bar adapted to lie, slide or stand in the rail and said slot. The upper rear edge of the bar when standing is adapted to engage in a notch in the forward flattened end of the recessed member and is provided with teeth engageable with said end to hold the seat raised or depressed.

In the accompanying drawing showing, by way of example, two of many possible embodiments of the invention, Fig. 1 is a fragmental side elevation, partly in section showing parts of an automobile with my invention applied thereto;

Fig. 3 is a plan showing parts of the invention associated with another form of chassis and the brake drum on the propeller shaft;

Fig. 4 is a rear elevational view of the rear block, per se;

Fig. 5 is a sectional view taken on the line 5—5 of Fig. 4;

Fig. 6 is an enlarged plan view of the rear block, per se, showing a different arrangement of the parts;

Figs. 7 and 8 are bottom plan and side elevation respectively of the recessed member; and Figs. 9 and 10 are side and end elevations of the detent rail.

Figure 1:
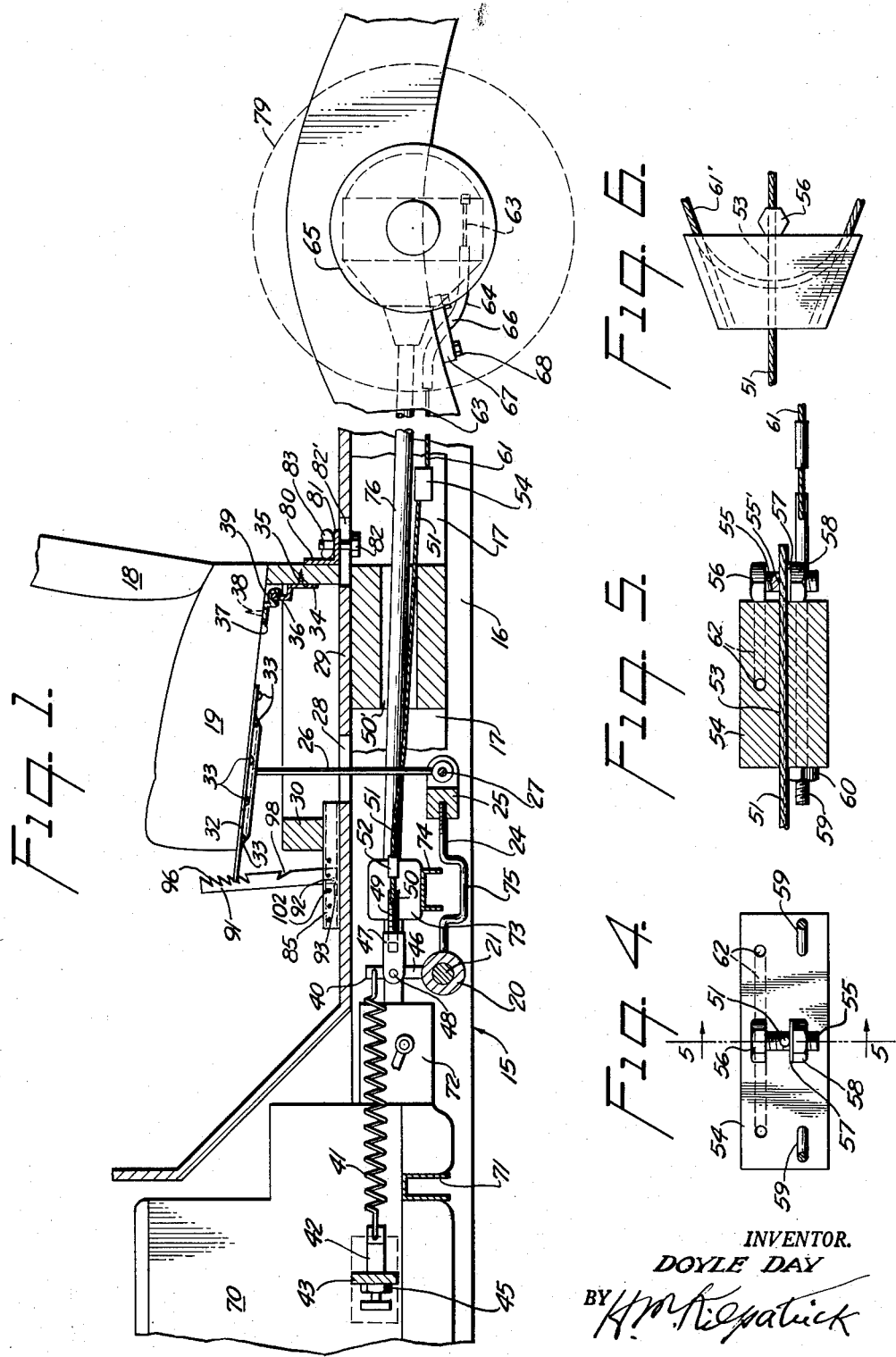
Figure 2:
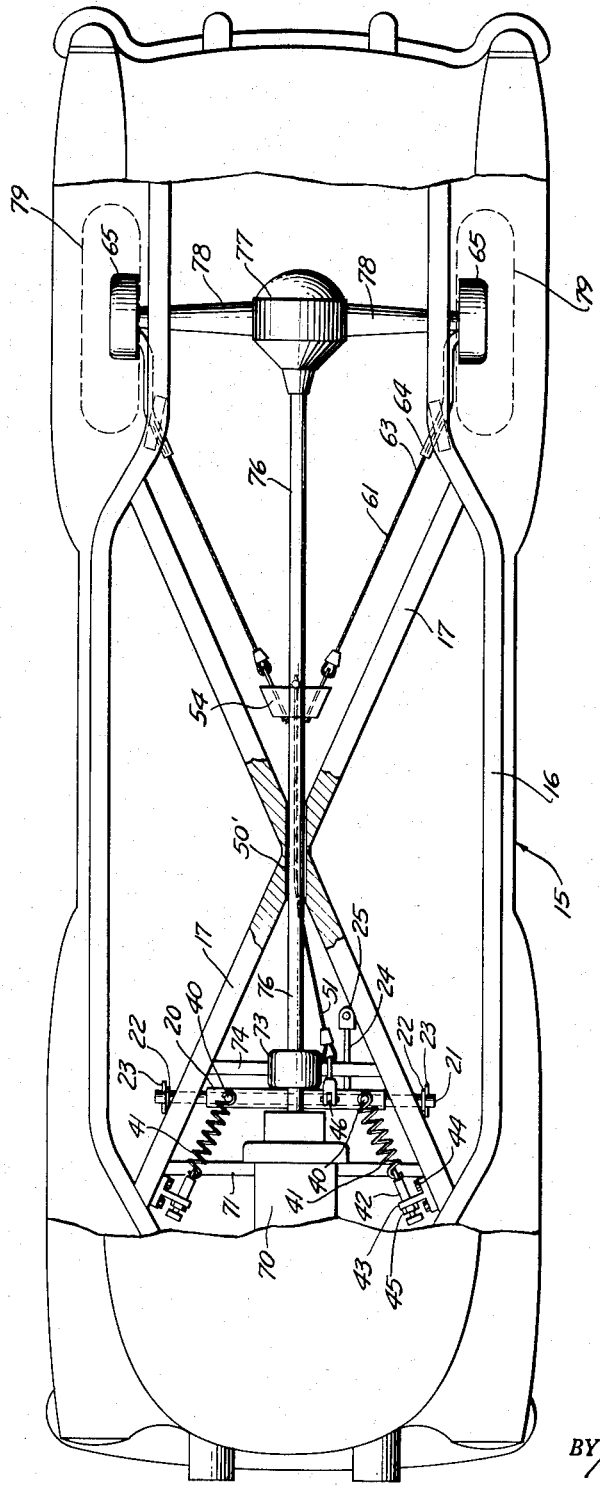
Fig. 2 is a plan on a slightly smaller scale showing parts of the invention of Fig. 1 applied to one form of a chassis of an automobile, parts of the automobile being removed and broken away.

The automatic brake mechanism is shown in Figs. 1 and 2 in connection with a motor vehicle 15 having a chassis 16 having crossed members 17, and a seat 18 including a separate seat cushion 19 hinged thereto.

The brake operating mechanism includes a tubular rocker 20 extended between the adjacent faces of the crossed members 17 slightly forward of the front seat 18, as shown in Fig. 2. The tubular rocker 20 is turnably mounted on a rod 21 which has its ends passed through complementary holes formed in the crossed members 17. Washers 22 (Fig. 2) are slipped over the ends of the rod 21 which extend beyond the crossed members 17. The ends of the rod 21 beyond the washers 22 are formed with openings through which conventional cotter pins 23 are passed for retaining the rod in position.

A threaded stud 24 extends rearward from the rocker 20 and has threaded thereon one end of a drag link 25. The free end 25 of the drag link is bifurcated and has the bottom end of a pressure link 26 received therein and pivotally connected thereto by means of a pivot pin 27. The free end of the pressure link 26 extends vertically upward through an elongated slot 28 formed in the floor 29 of the vehicle, within the supporting frame 30 of the front seat 18. The top end of the pressure link 26 is received in one of the openings or complementary recesses 31 (Fig. 7) formed in the bottom face of a recessed member 32 secured to the bottom face of the seat cushion 19, adjacent the front edge thereof, by several screws 33. The weight of the seat cushion 19 on the top of the pressure link 26 retains the top end of the link in position in the recess 31.

Means is provided for supporting the front seat cushion 19 to swing upward about its rear edge. This means comprises a bracket 34 secured to the inside of the frame 30 by several screws 35 and provided along its free top edge with an elongated horizontal rail 36 which is substantially circular in cross section, as shown in Fig. 1. Attached to the bottom face of the front seat cushion 19, adjacent the rear edge thereof, there is a bracket 37 secured in position by several screws 38. The bracket 37 is formed with a substantially circular receiver 39 in which the rail 36 is turnably supported, so as to pivotally support the seat cushion 19 for slight pivoting movement about its rear edge.

The pressure of the padding on the seat cushion 19 against the frame 30 and the back of the seat 18 retains the rail 36 in engagement with the receiver 39. However, the seat cushion 19 can be removed by lifting up thereon while simultaneously pressing rearward thereon, to compress the padding and disengage the receiver 39 from the rail 36. The brackets 34 and 37 may be continuously extended across the entire width of the seat cushion 19 or if desired separate brackets 34 and 37 can be provided at spaced points across the width of the seat cushion 19.

Resilient means is provided for turning the rocker 20 into a position in which the pressure link 26 will retain the front edge of the seat cushion 19 raised, as shown in Figs. 1 and 2. That resilient means is characterized by pegs 40 extended vertically upward from the tubular rocker 20 and which are provided at their free top ends with holes. Strong contraction springs 41 have one of their ends attached to the pegs 40 by being passed through the holes formed in the top ends thereof. The opposite ends of the springs 41 are secured to the ends of bolts 42 threaded through brackets 43. The brackets 43 are secured to the inner faces of the crossed members 17 by means of bolts 44. The bolts 42 are retained in desired adjusted positions with relation to the brackets 43 to control the tension on the springs 41, by means of lock nuts 45.

Means connects the tubular rocker 20 with the brakes of the vehicle 15 to cause the brakes to be applied when the seat cushion 19 is raised by the action of the springs 41 which turns the rocker to urge the pressure link 26 upward to raise the seat cushion 19. The means comprises a stud 46 (Fig. 1) which extends upward from the tubular rocker 20 and which has its top end engaged between the tines of a bifurcated end of a link 47 and pivotally connected thereto by a pin 48. Adjustably threaded into the free end of the link 47 there is a threaded member 49 formed at its free end with a hole 50. A cable 51 has one end extended through the hole 50 formed in the end of the member 49 and secured in position by a clamp 52.

The rear end of the cable 51 is extended through a hole 53 (Fig. 5) formed in a floating block 54. After being passed through that hole 53, the free end of the cable 51 is extended through a hole 55' (Fig. 5) formed in the shank 55 of a bolt 56. A washer 57 is slipped over the free end of the shank 55 and a nut 58 is threaded onto the shank 55 for clamping the end of the cable 51 adjustably in position in the hole of the shank 55 to hold the block 54 in a desired adjusted position on the end of the cable 51.

Several bolts 59 are slidably extended through the block 54 on opposite sides of the cable 51 and are retained in various adjusted positions with relation to the block 54 by means of nuts 60. Attached to the rear ends of the bolts 59 there are separate cables 61 which in turn have their free ends connected to the brakes, the interior of which is not shown, of the vehicle 15 as is generally known to those skilled in the art to which the present invention pertains.

The bolts 59 are to be used when the vehicle 15 to which the automatic brake mechanism of the present invention is applied, has separate cables 61 connected with the brakes, as shown in Figs. 2, 4 and 5. However, the block 54 is also formed with an arcuate passage 62 which is to be used when the vehicle has a single cable 61', see Fig. 6, which has its ends secured to the brakes of the vehicle. In such a case, one end of the cable 61' is passed through the arcuate passage 62 prior to being connected to its respective brake.

The rear ends of the cables 61 or 61' are formed as the inner actuating cables 63 of flexible Bowden control cables 64 passing into the brake drums 65, the inner cables 63 being connected to and operating the brake mechanism in the manner known to those skilled in the art. The outer conduit 66 of each Bowden control cable is secured to the chassis by a clamping block 67 secured by bolts 68 to the chassis.

The operation of the brake mechanism of the invention of Figs. 1 and 2 is as follows:

When the operator of the vehicle is not sitting on the front seat cushion, as shown in Figs. 1 and 2, the springs 41 will turn the tubular rocker 20 relative to its supporting rod 21, to urge the pressure link 26 upward and raise the seat cushion off the supporting frame 30 at the front edge thereof. The seat cushion 19 will pivot about the interengaged rail 36 and the receiver 39. Turning of the tubular rocker 20 will pull on the cable 51 and in turn pull the cables 61 or the cable 61' and inner actuating cables to apply the brakes. The springs 41 are sufficiently strong to effectively apply the brakes to retain the vehicle 15 even if resting on a steep incline.

Each of said pegs 40 is substantially twice the length of the stud 46 and less than half the effective length of the drag link 25, whereby pressure of the springs 41 to the brakes is increased, and less pressure on the seat is required to hold the pressure of the springs from the brakes.

When the operator enters the vehicle 15 and sits on the seat cushion 19 the same will be pivoted downward pressing down on the pressure link 26 turning the tubular rocker 20 against the action of the springs 41. This turning action will relax the pull on the cable 51 in turn relaxing the pull on the cables 61 or the cable 61' to release the brakes and permit the car to be driven normally. The brakes will be retained off as long as the operator occupies his position on the seat cushion 19.

The seat 18 is slidably supported as will be explained so as to permit its position with relation to the steering wheel, not shown, to be adjusted to suit the requirements of the particular operator. The threaded engagement of the drag link 25 with the threaded stud 24 and the extension of the pressure link 26 through the elongated slot 28 into any one of the recesses 31 permits the position of the link 26 to be adjusted to agree with the adjusted position of the seat 18 and retain its engagement with a recess 31.

From the foregoing it will be appreciated that an automatic brake mechanism is proposed which will effectively apply the brakes of a motor vehicle the moment that the operator leaves his seat and which will effectively retain the brakes in operation all the time that the operator is out of his seat. The mechanism of the present invention may be used in place of the usual hand brake. If the mechanism of the present invention is used in connection with the hand brake the cable of the hand brake will be attached to the block 54 alongside of or in conjunction with the cable 51.

From Figs. 1 and 2 it is seen that the springs 41 are forwardly diverged from each other and tend to balance the pressures on the rocker 20 and to draw the rocker to the center of the rod 21 to reduce the pressure and wear of the rocker on the members 17.

From Figs. 1 and 2 it is seen that the springs 41 and other parts of the brake operating mechanism are not interfered with by the motor 70, rear motor support 71, transmission housing 72, the propeller shaft 76, the universal joint 73 or its supporting bracket 74. The stud 24 is intermediately downwardly offset as at 75, to avoid contact with the bracket 74.

From the universal joint 73 the propeller shaft 76 extends rearwardly through a hole 50' at the crossing part of the crossing members 17, through which hole the cable 51 also passes. The rear part of the propeller shaft extends to the differential in the differential housing 77 with which are associated the axle members 78, the wheels 79 and the brake drums 65.

In the form of invention as shown in Fig. 3, the brake operating mechanism is essentially the same as in Figs. 1 and 2, but is shown in combination with a chassis comprising two side members 16a; and the brake operated by the brake operating mechanism comprises a brake drum 65a on the propeller shaft 76. The springs 41 are anchored on brackets 43a mounted on the members 16a and are connected to pegs 40 carried by the rocker 20a engaging the side members 16a and adapted to rock on the rod 21a carried by said members. The stud 46, and bifurcated link 47 of Fig. 3 are similar to the same parts shown in Figs. 1 and 2, but the cable 63a secured to the link 47 connects directly with the brake within the drum 65a and constitutes the inner member 63a of the flexible Bowden control cable 64a anchored within the brake drum, the inner member 63a operating the drum brake in the usual manner, when the operator rises from his seat and the link 26 rises as explained of Fig. 1.

In use it is at times desirable that the seat cushion be locked in raised position with the brakes applied so that the occupant can sit on the seat without releasing the brakes; and at other times it is desirable that the seat cushion shall be locked down so the operator can rise without applying the brake.

Means for thus locking the seat cushion raised or lowered in different positions of forward or rearward adjustment of the seat are shown in Figs. 1 and 7 to 10, and means for holding the seat in adjusted position forwardly or rearwardly are also shown in Fig. 1.

The seat supporting frame 30 is adjustably mounted for forward or rearward movement on the floor; and angle pieces 80 secured to the rear of the frame each have a part 81 resting on the floor and adjustably secured to the floor by a bolt 82 passing through said part and a slot 82' in the floor and having a wing nut 83 thereon adjustably clamps the support to the floor.

The pressure link 26 upwardly extended through the slot 28 in the floor has its upper end engaged in one of the openings 31 (Fig. 7) of the recessed member 32 depending upon the adjusted position of the seat and the leg length of the occupant.

A tubular detent rail 85 (Figs. 1, 9 and 10) longitudinal to the vehicle and of D-shaped cross-section and having a lower flat wall 86 secured on the floor 29 with its intermediate part under a notch 87 (Fig. 7) in the projecting front end of the recessed member 32, has its curved upper wall provided with a longitudinal slot 88 open at its forward end and closed at the rear end. The rail may be secured to the floor in any suitable manner as by welding or by bolts 89 and 90 passing through the floor and the rail at the middle of the rear end of the rail and on both sides of the front end of the slot. A flat detent bar 91 adapted to lie and slide in the rail with its upper edge in said slot is provided with a cross pin 92 passing through the lower corner of the rear end of the bar when horizontal and housed in the rail, for retaining said end in the rail. The rear end face 93 of the bar, when lying in the rail, is slightly inclined rearwardly upwardly, whereby the bar when stood with said face flat against the bottom of the rail will incline slightly away from the seat as in Fig. 1. The upper half of the rear edge of the bar when thus standing is adapted to engage in said notch 87 of the recessed member and is provided in its upper half with a series of upwardly facing ratchet teeth 94, each having a slightly downwardly inwardly inclined upper face 95, and a sharp point 96 (Fig. 7) engageable in an aperture 97 just behind the notch 87, whereby when it is desired that the brakes shall remain applied when the seat is occupied, the seat may be raised and one of said ratchet teeth caught in the aperture 97 behind the notch, thus to hold the seat raised and the brake applied. Said rear edge of the bar is provided with a lower notch 98 having an abrupt downwardly facing shoulder 99 slightly upwardly inwardly inclined and having a somewhat sharp outer point 100 adapted to engage from above in said aperture 97 when the cushion is down, whereby when it is desired that the brake shall remain released when the seat cushion is not occupied, the seat cushion may be held depressed and the recess member may be engaged in said lower ratchet notch 98 and the seat held down and the brakes released. The side walls of the rail are provided with a series of pairs of laterally alined holes 101, adapted to selectively receive a cotter pin 102, to limit the forward movement of the lower end of the raised detent bar, to facilitate positioning the bar relative to the seat in its adjusted position.

The forward inclination of the bar 91 when resting on the edge 93 causes the bar to tend to fall into the rail unless the bar is held standing by the engagement of a point 96 or 100 in the aperture 97. When it is desired to release the seat cushion from the position held by the bar, it is merely necessary to lift the seat cushion and disengage the aperture 97 from the point 96 or reoccupy and/or depress the seat cushion and automatically disengage the aperture 97 from the point 100, to allow the bar to automatically fall frontward and partly into the rail and rest on the cotter pin, when the pin is left in the rail and to be pushed rearwardly into the rail 85.

When the cotter pin 102 is left in the alined apertures and the detent bar automatically falls, the bar is held in an inclined position by said pins 92 and 102 and may automatically slide rearwardly out of the way of the operator especially when shaken by the moving vehicle.

This application is a continuation-in-part of my co-pending application Serial Number 93,858, filed May 18, 1949 (now forfeited and abandoned), for Automatic Emergency Parking Brake for Motor Vehicles.

Having thus described by invention, what I claim as new and desire to secure by United States Letters Patent is:

1. In combination, a motor vehicle having rear brakes and a chassis having crossed members forming a cross part and provided forwardly of the cross part with transversely alined holes and at the cross part with a hole longitudinal to the vehicle and opening in the front and rear angles formed by said cross members; a seat mounted above the chassis for upward movement at its front part and having a lower recess in said front part; a rod transverse to the vehicle passed through and held in said alined holes and supported by said members forwardly of and below the forward part of the seat; a tubular rocker turnably mounted on said rod and engaging the rod substantially throughout and to said members; a rearwardly extended drag link mounted fast on the rocker; an upwardly extended pressure link pivoted to the free end of the drag link and having its upper end received in said recess; an upwardly extended peg fast on each end of the rocker; strong contraction springs secured to the free end of the pegs, respectively, and extended forwardly and anchored to the forward part of the adjacent cross members; an upwardly extended stud mounted fast on the mid part of the rocker; a rearwardly extended flexible cable secured to the free end of the stud and extended and guided through said hole at the cross part; and flexible means for connecting the rear end of the cable to said brakes of the vehicle; said springs being forwardly diverged from each other to tend to balance the pressures on the rocker and to draw the rocker to the center of the rod to reduce pressure and wear of the rocker on said members.

2. In combination, a motor vehicle having rear brakes and a chassis having forwardly extending members; a rod transverse to the vehicle supported by said members; a seat mounted above the chassis for upward movement of its front part, its front part disposed rearwardly of and above the rod; a tubular rocker turnably mounted on said rod and extending to said members; a rearwardly extended drag link mounted fast on the rocker; a pressure link pivoted to the free end of the drag link and engaging under said seat; an upwardly extended peg fast on each end of the rocker; strong contraction springs secured to the free end of the pegs, respectively, and extended forwardly and anchored to the adjacent members; an upwardly extended stud mounted fast on the mid part of the rocker; a rearwardly extended flexible cable secured to the free end of the stud; an elongated floating block transverse to the axis of the chassis and provided with a hole substantially alined with said axis and receiving the cable; a threaded bolt at the rear face of the block and having a transverse hole receiving the cable; a nut on said bolt clamping the end of the cable adjustably to the bolt, to hold the block on the cable; said block being provided with an arcuate passage above the hole in the block and having its end respectively opening through opposite ends of the rear face of the block; and a cable passed through said passage at opposite sides of the bolt, to leave space for the bolt, and having its ends adapted to be secured to said brakes of the vehicle.

3. In combination, a motor vehicle having braking means and a chassis having forwardly extending members; a transverse rocker turnably mounted between and extending substantially to said members; a seat mounted above the chassis for up and down movement and above the level of the rocker; a rearwardly extended drag link mounted fast on the rocker; a pressure link pivoted to the free end part of the drag link and engaging under said seat; an upstanding peg fast on each end of the rocker; strong contraction springs secured to the free end of the pegs, respectively, and extended forwardly and anchored on the forward part of the adjacent members, leaving space between the springs for the power transmission of the vehicle, and adapted to swing the pegs forwardly and raise the drag and pressure links and the seat, when the seat is unoccupied; an upstanding stud mounted fast on the rocker; and a rearwardly extended flexible cable secured to the free end of the stud and adapted to be attached to said braking means of the vehicle to apply braking pressure of the contraction springs to said braking means; each of said pegs being longer than said stud and less than the length of said drag link.

4. In a motor vehicle having a chassis having braking means and forwardly extending members at the sides thereof, rear drive wheels and axle, and power means substantially along the longitudinal axis of the chassis including a forward motor and transmission means from the motor to the axle, the combination of a driver's seat mounted above the chassis for up and down movement; a transverse rocker turnably mounted between and extending substantially to said members below the level of the seat; a substantially horizontally radially extended drag link mounted fast on the rocker; a pressure link pivoted to the free end part of the drag link and engaging under said seat; a substantially vertical peg fast on each end of the rocker; substantially longitudinal strong contraction springs secured to the free end of the pegs, respectively, and anchored on the adjacent members, leaving space between the springs for said power means; a stud mounted fast on the rocker; and a flexible cable secured to the free end of the stud and adapted to be attached to said braking means of the vehicle; the position of said pegs, stud and drag link on the rocker being such that pull by the springs on the pegs raises the drag and pressure links and the seat, when the seat is unoccupied, and pulls on the cable to apply braking pressure of the contraction springs to the braking means, each peg being longer than the stud and less long than the length of said drag link.

5. In combination, a motor vehicle having chassis and brakes; a seat support supported on the chassis; a seat cushion hingedly mounted on said support for up and down movement at its front part; a recessed member mounted on the lower front margin of the seat cushion and having a forward flat notched end and a lower recess; an upwardly extended pressure link engaged in said recess; brake operating means connected to said brakes and link and constructed and adapted to yieldably force the link and seat upwardly to an upper position and to apply the brakes when the seat is unoccupied and to be actuated by the link to release the brakes when the seat is pressed down by an occupant; a tubular detent rail longitudinal to the vehicle mounted beneath the recessed member and having an upper longitudinal slot; and a bar adapted to lie, slide and stand in the rail and said slot and having one end loosely pivotally held in the rail; the upper rear edge of the bar when standing having teeth adapted to engage in said notched end to hold the seat raised or depressed.

6. In combination, a vehicle having a brake and a seat mounted for up and down movement at its front part; a forwardly projecting member on said part having an upwardly opening hole therein; spring operated means connected to said seat and brake to move the seat to an upper position and apply the brake when the seat is empty and to release the brake when the seat is pressed down; a detent structure mounted on the vehicle beneath said member; a detent bar pivotally connected to said detent structure at a point more rearward than said hole, and provided with a pointed part engageable in said hole to hold the bar forwardly inclined and to hold the seat depressed when unoccupied and to hold the brake released; whereby when the depressed seat is occupied, said hole is moved down slightly to release the point and allow the detent bar to fall forward, automatically releasing the seat from the depressed position.

7. A combination as in claim 6, said structure being positioned and constructed to receive and slidably support said bar in a downwardly rearwardly inclined position, in which the bar may move rearwardly out of the way of the operator.

8. In combination, a vehicle having a brake and a seat mounted for up and down movement at its front part; a forwardly projecting member on said part having a downwardly opening hole therein; spring operated means connected to said seat and brake to move the seat to an upper position and apply the brake when the seat is empty and to release the brake when the seat is pressed down; a detent structure mounted on the vehicle beneath said member; a dentent bar pivotally connected to said member and engageable with the front part of said member and provided with an upwardly pointed part engageable in said hole to hold the seat raised and the brake applied; said bar being pivoted to said structure at a point more rearward than said hole, whereby when the seat held raised is further raised, the bar will automatically fall forwardly out of seat holding position.

9. A combination as in claim 8, said structure being positioned and constructed to receive and slidably support said bar in a downwardly rearwardly inclined position, in which the bar may move rearwardly out of the way of the operator.

10. In combination, a vehicle having a brake and a seat mounted for up and down movement at its front part; a member on said part having a forward notch and a hole behind the notch; spring operated means connected to said seat and brake to move the seat to an upper position and apply the brake when the seat is empty and to release the brake when the seat is pressed down; a tubular detent rail longitudinally mounted on the vehicle and having beneath said member a narrow upper longitudinal slot and transversely alined apertures on opposite sides of the slots; a flat detent bar adapted to lie, slide or stand in the rail and slot; a transverse pin passing through the lower rear part of the bar in the rail to retain said end in the rail; the rear end face of the bar lying in the rail being inclined rearwardly upwardly at an angle that will cause the bar standing in the rail to incline forwardly in unstable equilibrium; the upper part of the bar when thus standing being engageable in said notch and having teeth each having a point engageable in said hole to hold the bar standing, the seat raised and the brake applied, raising the seat further releasing the pointed tooth and allowing the bar to fall forwardly; and a cotter pin selectively disposable in transversely alined apertures of the rail to facilitate positioning the bar and against which the detent bar may fall and be held by said pins in inclined position and when shaken by the moving vehicle slide rearwardly out of the way of the operator.

11. In combination, a vehicle having a brake and a seat mounted for up and down movement at its front part; a member on said part having a forward notch and a hole behind the notch; spring operated means connected to said seat and brake to move the seat to an upper position and apply the brake when the seat is unoccupied and to release the brake when the seat is pressed down; a tubular detent rail longitudinally mounted on the vehicle and having beneath said member a narrow upper longitudinal slot and transversely alined apertures on opposite sides of the slots; a flat detent bar adapted to lie, slide or stand in the rail and slot; a transverse pin passing through the lower rear part of the bar in the rail to retain said end in the rail; the rear end face of the bar lying in the rail being inclined rearwardly upwardly at an angle that will cause the bar standing in the rail to incline forwardly in unstable equilibrium; said bar being provided with a lower notch forming a downwardly pointed point engageable in said hole to hold down the seat when unoccupied and to hold the pointed part in the recess and the brakes unapplied; whereby when the depressed seat is again occupied, said hole is moved down to release the point and allow the detent bar to fall forward, automatically releasing the seat from the depressed position; and a cotter pin selectively disposable in transversely alined apertures of the rail to facilitate positioning the bar and against which the detent bar may fall and be held by said pins in inclined position and when shaken by the moving vehicle slide rearwardly out of the way of the operator.

References Cited in the file of this patent

UNITED STATES PATENTS

| | | |
|---|---|---|
| 755,533 | Patton et al. | Mar. 22, 1904 |
| 1,158,891 | Braun | Nov. 2, 1915 |
| 1,708,009 | Burger et al. | Apr. 9, 1929 |
| 1,880,129 | Gattie | Sept. 27, 1932 |